(12) United States Patent
Jiang (10) Patent No.: US 9,361,856 B2
(45) Date of Patent: Jun. 7, 2016

(54) LIQUID CRYSTAL DISPLAY WITH PHOTO-LUMINESCENT MATERIAL LAYER

(71) Applicant: Google Technology Holdings LLC, Mountain View, CA (US)

(72) Inventor: Jun Jiang, Lake Zurich, IL (US)

(73) Assignee: Google Inc., Mountain View, CA (US)

( * ) Notice: Subject to any disclaimer, the term of this patent is extended or adjusted under 35 U.S.C. 154(b) by 297 days.

(21) Appl. No.: 13/744,550

(22) Filed: Jan. 18, 2013

(65) Prior Publication Data
US 2014/0204128 A1    Jul. 24, 2014

(51) Int. Cl.
G09G 5/10 (2006.01)
G02F 1/1335 (2006.01)
G09G 3/34 (2006.01)
G02F 1/133 (2006.01)

(52) U.S. Cl.
CPC .............. *G09G 5/10* (2013.01); *G02F 1/13318* (2013.01); *G02F 1/133617* (2013.01); *G09G 3/3406* (2013.01); *G02F 1/133555* (2013.01); *G02F 2001/133614* (2013.01); *G09G 2320/0285* (2013.01); *G09G 2330/021* (2013.01); *G09G 2360/144* (2013.01)

(58) Field of Classification Search
CPC . G09G 5/10; G09G 3/3406; G09G 2360/144; B82Y 20/00; G02F 1/1336; G02F 1/133617; G02F 2001/133618
USPC .................................................. 345/58, 61, 82
See application file for complete search history.

(56) References Cited

U.S. PATENT DOCUMENTS

| | | | |
|---|---|---|---|
| 5,815,228 A | 9/1998 | Flynn | |
| 6,031,247 A | 2/2000 | Lee | |
| 7,746,423 B2 | 6/2010 | Im et al. | |
| 8,120,239 B2 | 2/2012 | Cheon et al. | |
| 2004/0008474 A1* | 1/2004 | Kardach et al. | ............... 361/681 |
| 2005/0037815 A1 | 2/2005 | Besharat et al. | |

(Continued)

FOREIGN PATENT DOCUMENTS

JP    2004-287323    10/2004

OTHER PUBLICATIONS

PCT/US2014/012031; PCT International Search Report and Written Opinion mailed Jun. 10, 2014, 30 pages.

(Continued)

*Primary Examiner* — Amare Mengistu
*Assistant Examiner* — Sarvesh J Nadkarni
(74) *Attorney, Agent, or Firm* — Blakely Sokoloff Taylor & Zafman LLP (57)    ABSTRACT

In one embodiment, a method for controlling a liquid crystal display (LCD) is provided. The method receives a first light from a light source structure at a light emitting layer and emits from the light emitting layer a first color component, a second color component, and a third color component. The method then receives a second light through a first polarizer layer of a first polarization state positioned above the light emitting layer, a liquid crystal layer positioned above the first polarizer layer, and a second polarizer layer of a second polarization state positioned above the liquid crystal layer and converts the second light into the first color component, the second component, and the third color component in the light emitting layer. An intensity of the first light is dynamically controlled based on the converting of the second light.

18 Claims, 11 Drawing Sheets

(56) References Cited

U.S. PATENT DOCUMENTS

| | | | |
|---|---|---|---|
| 2006/0125978 A1* | 6/2006 | Hiyama et al. | 349/96 |
| 2008/0252575 A1* | 10/2008 | Brown | 345/83 |
| 2009/0322986 A1 | 12/2009 | Wei et al. | |
| 2011/0216271 A1* | 9/2011 | Suzuki | G02F 1/13362 349/71 |
| 2012/0147296 A1* | 6/2012 | Montgomery et al. | 349/70 |
| 2012/0154464 A1 | 6/2012 | Ninan et al. | |
| 2012/0256892 A1* | 10/2012 | Hung et al. | 345/207 |

OTHER PUBLICATIONS atherine Bourzac, Quantum Dots Give Notebooks a New Glow, http://www.technologyreview.com/news/428643/quantum-dots-give-notebooks-a-new-glow/, 2012-Jun. 2012, all pages.

Jon Peddle, "Quantum dot filter displays are the next big thing", Graphic Speak, News and Commentary for CAD and DCC Professionals, posted Dec. 20, 2011, http://gfxspeak.com/2011/12/20/quantum-dot-filter-displays-are-the-next-big-thing/, all pages.

PCT/US2014/012031; PCT International Preliminary Report on Patentability, mailed Jul. 30, 2015, 25 pages.

* cited by examiner

LIQUID CRYSTAL DISPLAY WITH PHOTO-LUMINESCENT MATERIAL LAYER

BACKGROUND

Many electronic computing devices include displays that provide visible full color. One example of a display is a liquid crystal display (LCD), which may be a thin, flat-panel display that uses light modulating properties of liquid crystals. LCDs may be used in various systems, such as computer monitors, mobile devices, televisions, etc.

LCDs may use white light-emitting diodes (LEDs) to generate a backlight for a color filter array to define color pixels. Light passes through the liquid crystals and through the color filter, which then defines red, green, and blue (RGB) colors. The color filters typically only have 30% transmission, which is an inefficient transmission of light. Also, the transmission ratio of a high color gamut LCD is even worse, as the LCDs typically rely on thicker color filters to generate rich colors.

DETAILED DESCRIPTION

Described herein are techniques for a liquid crystal display (LCD) structure. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a method for controlling a liquid crystal display (LCD) is provided. The method receives a first light from a light source structure at a light emitting layer that includes a photo-luminescent material that emits light with different wavelengths upon excitation by the first light. The light emitting layer emits a first color component based on receiving the first light, a second color component based on receiving the first light, and a third color component based on receiving the first light. The method then receives a second light through a first polarizer layer of a first polarization state positioned above the light emitting layer, a liquid crystal layer positioned above the first polarizer layer, and a second polarizer layer of a second polarization state positioned above the liquid crystal layer and converts the second light into the first color component, the second component, and the third color component in the light emitting layer. An intensity of the first light is dynamically controlled based on the converting of the second light.

In one embodiment, an apparatus includes: a light source structure configured to emit a light; a light emitting layer including a photo-luminescent material that emits light with different wavelengths upon excitation by the light emitted by the light source structure, wherein a first portion of the photo-luminescent material emits a first color component based on receiving the light, a second portion of photo-luminescent material emits a second color component based on receiving the light, and a third portion of the photo-luminescent material emits a third color component based on receiving the light; a first polarizer layer of a first polarization state positioned above the light emitting layer; a bottom glass; a liquid crystal layer positioned above the first polarizer layer; a top glass; a second polarizer layer of a second polarization state positioned at a top surface of the top glass, wherein a distance between the light emitting layer and the liquid crystal layer is based on a desired angle of emission for the first color component, the second color component, and the third color component being emitted from the light emitting layer and a width of a pixel in the liquid crystal layer.

System Overview

Figure 1A:
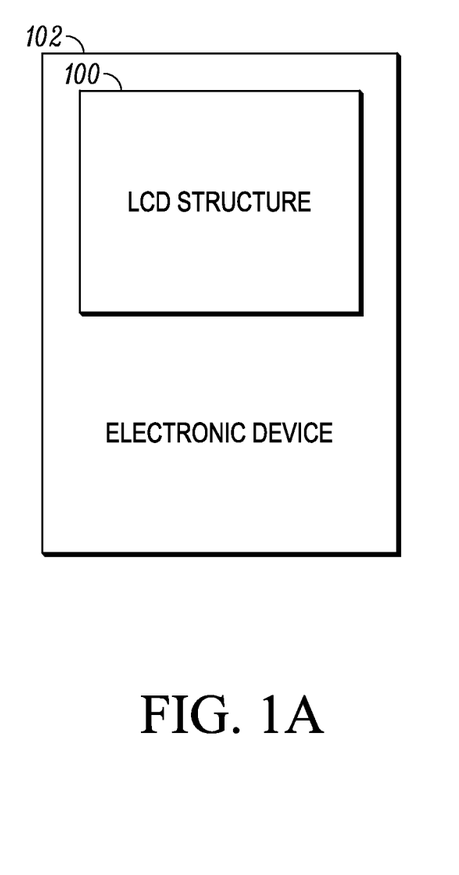
FIG. 1A depicts an example of an LCD structure of an electronic device according to one embodiment.

FIG. 1A depicts an example of an LCD structure 100 of an electronic device 102 according to one embodiment. Electronic device 102 may include a mobile device, television, smartphone, tablet device, wearable devices such as glasses, goggles, or wrist-worn devices, or any other display devices, including pop-up automobile displays.

As will be described in more detail below, particular embodiments use a photo-luminescent material arranged in Red, a Green, a Blue (R, G, B) sub-pixel fashion, such as pixelated Red, Green, and Blue quantum dot cells or a Red, a Green, a Blue phosphor material, to provide a color display on LCD structure 100. The material emits light with different wavelengths upon excitation by another light. For example, quantum dots or a phosphor material emit a wavelength when excited by an excitation source, such as an ultra violet (UV) or blue light. The size of the quantum dots can be sorted or controlled in such a way that each sub-pixel only contains only quantum dots of specific size range to emit different wavelengths of light. For example, larger dots emit more red light and smaller dots emit more blue light while medium size dots emit green light. Quantum dots with all mixed sizes will emit a white light having a spectrum that shows contribution from red, green and blue quantum dots. The phosphor material operates similarly, as red phosphor replaces large quantum dots, green phosphor replaces medium size quantum dots, and blue phosphor replaces small size quantum dots. Particular embodiments may be described with respect to quantum dots; however, it will be understood that other materials emitting light of different wavelengths may be used, such as a phosphor material.

Particular embodiments use pixelated quantum dot cells to provide a full color gamut for a color display. The quantum dots emit light with a narrow spectrum width, which can provide a higher color gamut. Further, color filters may not be needed to provide the full color gamut and thus LCD structure 100 may be more efficient than a structure using color filters.

In one embodiment, LCD structure 100 uses the quantum dots while minimizing crosstalk or parallax. Crosstalk occurs when light emitted from a quantum dot associated with a sub-pixel leaks into another sub-pixel associated with another quantum dot. Particular embodiments provide methods for constructing LCD structure 100 to minimize crosstalk, which will be described in more detail below.

Additionally, in another embodiment, LCD structure 100 is operated in different modes of operation depending upon ambient light excitation. For example, different modes of operation may include a transmissive mode, which solely uses a backlight source; a reflective mode, which turns off the backlight source and uses ambient light as the light source; and a transflective mode, which uses both light generated from the backlight source and also the ambient light as the light source. Particular embodiments may control the backlight source based on the amount of ambient light (e.g., the blue component of ambient light) detected. Additionally, the transmission ratio or transmittance of the liquid crystal layer may be controlled based on the amount of ambient light being converted into red, green, or blue light.

Figure 1B:
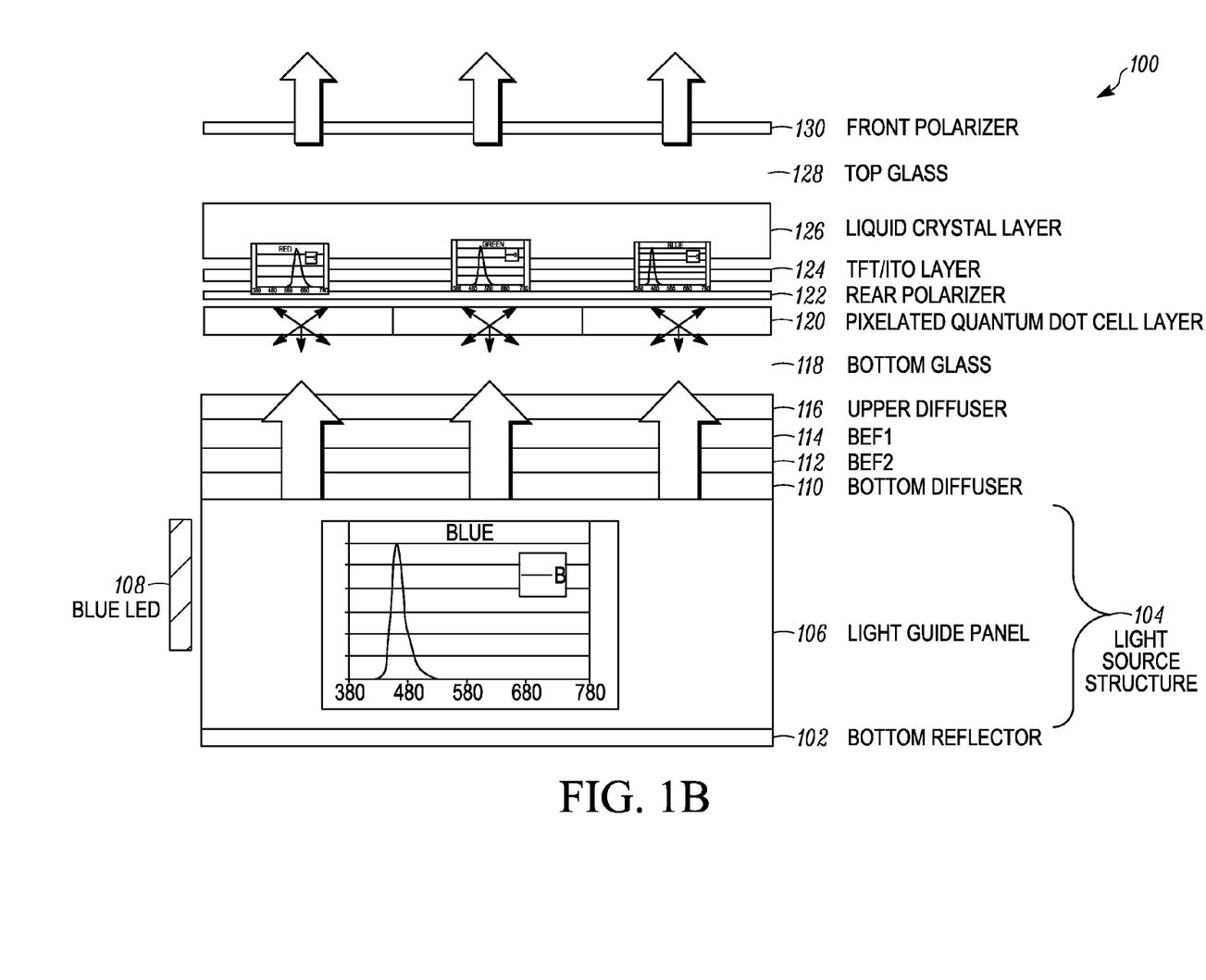
FIG. 1B shows a more detailed example of a cross-section view of the LCD structure according to one embodiment.

Before describing the above implementations, LCD structure 100 will be described in more detail. FIG. 1B shows a more detailed example of a cross-section view of LCD structure 100 according to one embodiment. Also, the view shown is for one pixel where LCD structure 100 may include many pixels that include the same structure shown.

This structure may be an "in-cell" structure where rear polarizer 122 and pixelated quantum dot cell layer 120 are positioned on top of bottom glass 118 and are inside the liquid crystal layer cells. It will be understood that variations of LCD structure 100 may be appreciated. For example, as will be described in more detail below, certain layers of LCD structure 100 may be rearranged in different positions, such as in an "out of cell" implementation where rear polarizer 122 and pixelated quantum dot cell layer 120 are positioned below bottom glass 118.

In LCD structure 100, a bottom reflector 102 is below a light source structure 104. In the embodiment shown, light source structure 104 includes a light guide panel 106 and a light emitting diode (LED) 108 at the edge of light guide panel. LED 108 may be external to LCD structure 100 and also emits blue light, although other colors may also be used, such as white light, for example. Also, LED 108 emits light perpendicular to LCD structure 100 and light guide panel 106. Light guide panel 106 then guides the light in a direction upward through LCD structure 100. Different examples of light source structure 104 will also be described below.

Above light source structure 104, a bottom diffuser 110, a second brightness enhancement filter (BEF2) 112, and a first brightness enhancement filter (BEF1) 114, and upper diffuser 116 are provided. A person having ordinary skill in the art will appreciate the functions performed by these elements. Also, a bottom glass 118 is below a pixelated quantum dot cell layer 120. It should be noted that in other embodiments, bottom glass 118 may be located in other positions.

Pixelated quantum dot cell layer 120 is located below rear polarizer 122. A thin film transistor (TFT)/indium-tin oxide (ITO) layer 124 is also provided. A liquid crystal layer 126 is located below a top glass 128. A front polarizer 130 is shown as located above top glass 128.

In one embodiment, each pixel of LCD structure 100 may include sub-pixels that are associated with a quantum dot of a different size (or phosphor material). As discussed above, quantum dots emit light with a wavelength characteristic based on the quantum dot's size. In a red sub-pixel, a first quantum dot may absorb blue light and emits red light; a second quantum dot in a second sub-pixel may absorb blue light and emits green light; and a third quantum dot in a third sub-pixel emits blue light. Although an embodiment is described using three sub-pixels—R, G, and B subpixels each filled with a different size quantum dot, other implementations are possible. For example, some implementations may have more sub-pixels, such as four sub-pixels—R, G, B and white sub-pixels, where R, G, B are similar to the 3 sub-pixel implementation, but the additional white sub-pixel is filled with a quantum dot of mixed size to generate a white spectrum, which may be referred to as a Pentile pixel design.

As light from light source structure 104 is emitted through bottom glass 118 into quantum dot cell layer 120, which emits red, green, or blue light, that light is then passed through rear polarizer 122, which may be of a first polarization state. The light passing through rear polarizer 122 may be of a first polarization state based on the polarization of rear polarizer 122. When liquid crystal layer 126 is ON, the polarization state of light is rotated by liquid crystal layer 126, passes through top glass 128, and then passes through front polarizer 130. If liquid crystal layer 126 is in OFF state, liquid crystal layer 126 will not rotate the polarization state of light emitted from rear polarizer 122, then the light would be blocked by front polarizer 130. This is because the polarizations of rear polarizer 122 and front polarizer 130 typically are crossed, i.e., offset by 90°. Thus, the light needs to be rotated in order to pass through both rear polarizer 122 and front polarizer 130. The liquid crystals in liquid crystal layer 126 may be rotated by applying a drive signal to TFT/ITO layer 124.

Although this structure has been described, variations of this structure may exist, and will be described in more detail below. However, in all described example structures herein, pixelated quantum dot cell layer 120 is located below rear polarizer 122. Positioning pixelated quantum dot cell layer 120 below rear polarizer 122 may isolate pixelated dot cell layer 120 from ambient light excitation in certain conditions. For example, LCD structure 100 can be controlled by turning OFF liquid crystal layer 126 such that ambient light does not pass through rear polarizer 122 and thus does not cause unwanted excitation of pixelated quantum dot cell layer 120. This process will be described in more detail below. However, if pixelated quantum dot cell layer 120 was located above rear polarizer 122, LCD structure 100 could not be reliably controlled to block ambient light from exciting quantum dots in pixelated quantum dot cell layer 120, therein causing pixelated quantum dot cell layer 120 to emit light and may cause emission of unwanted electrical noise.

Figure 2:
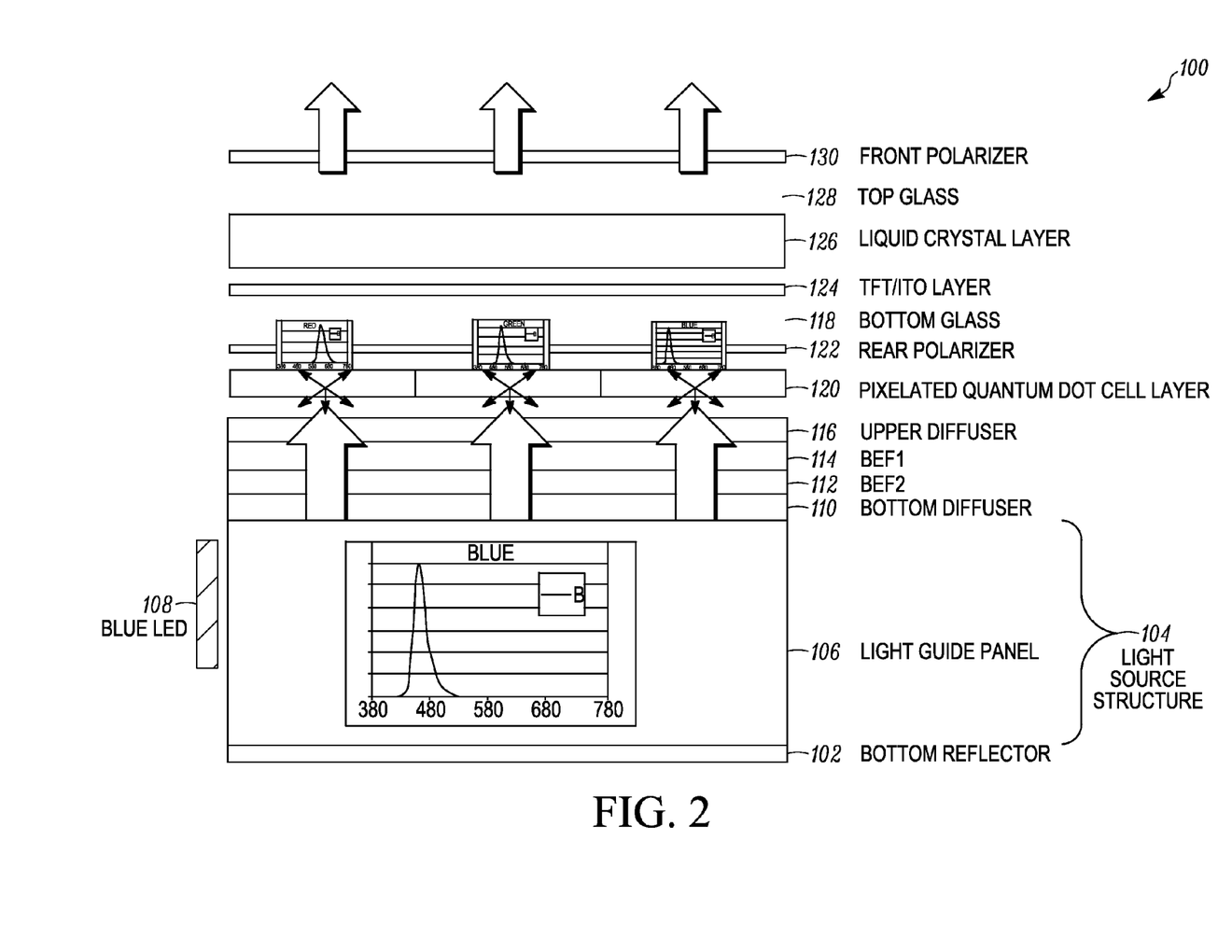
FIG. 2 depicts another example of the LCD structure according to one embodiment.

FIG. 2 depicts another example of LCD structure 100 according to one embodiment. In this example, rear polarizer 122 and pixelated quantum dot cell layer 120 are on the back of bottom glass 118. Thus, pixelated quantum dot cell layer 120 and rear polarizer 122 are not located in-cell with liquid crystal layer 126. LCD structure 100 operates the same way as described with respect to LCD structure 100 of FIG. 1B. However, as will be described in more detail below, to minimize crosstalk, the thickness of bottom glass 118 and thickness of rear polarizer 122 in FIG. 2 may be different from those same components depicted in FIG. 1B.

Figure 3:
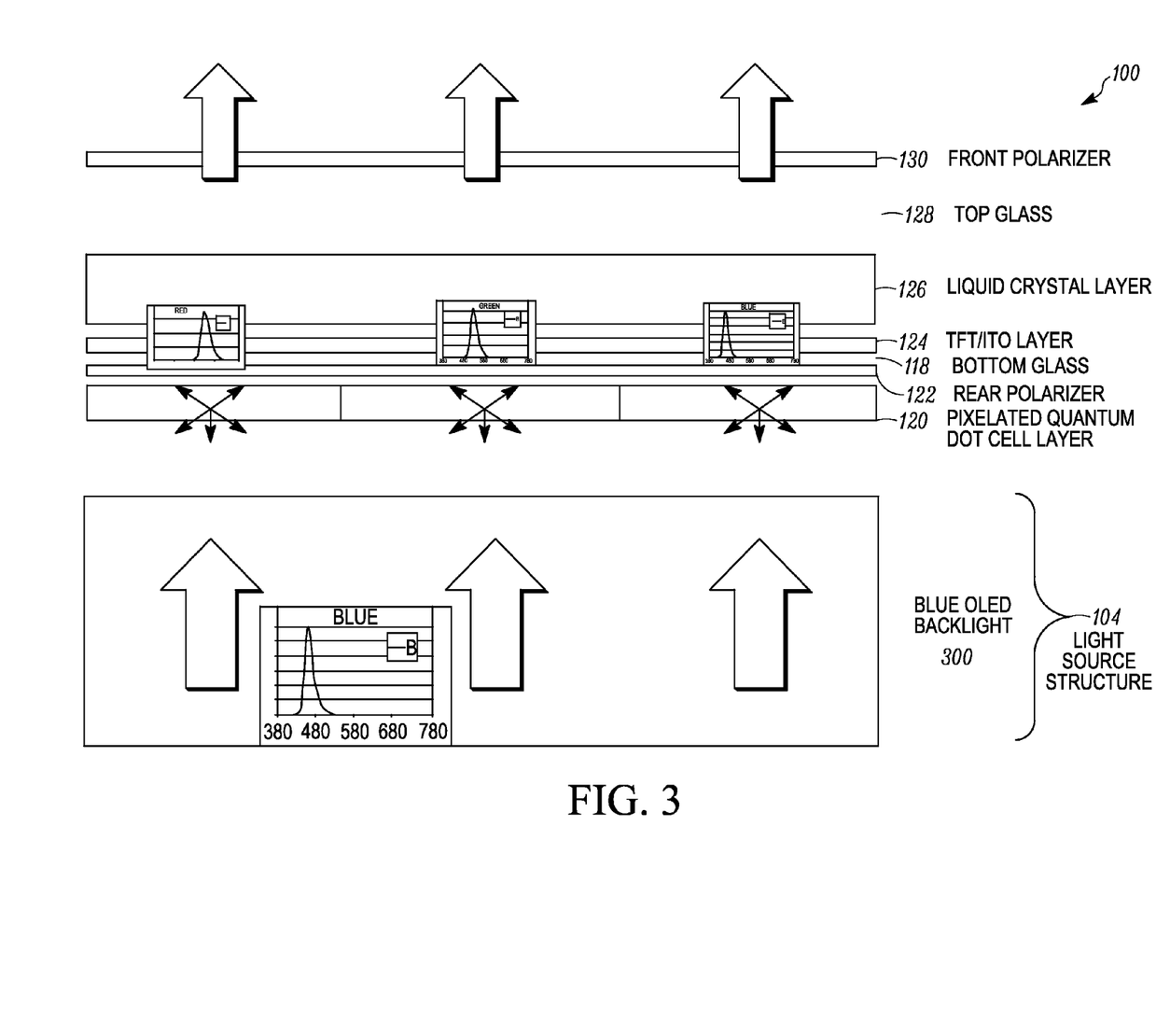
FIG. 3 depicts an example of the LCD structure that uses an organic light emitting diode (OLED) according to one embodiment.

Although particular embodiments were described as using an external blue LED, other embodiments may use different backlights. FIG. 3 depicts an example of LCD structure 100 that uses an organic light emitting diode (OLED) according to one embodiment. As shown, light source structure 104 includes a blue OLED backlight 300. In this case, blue OLED backlight 300 is located inside LCD structure 100. This may reduce the thickness of LCD structure 100 because a blue OLED backlight 300 may be thinner than a conventional backlight that uses light guide panel 106. For example, the thickness may be reduced up to 0.5 mm. Additionally, pixelated quantum dot cell layer 120 and rear polarizer 122 may be positioned in-cell with liquid crystal layer 126, which further reduces the thickness of LCD structure 100 as described above.

Crosstalk or Parallax

Figure 4:
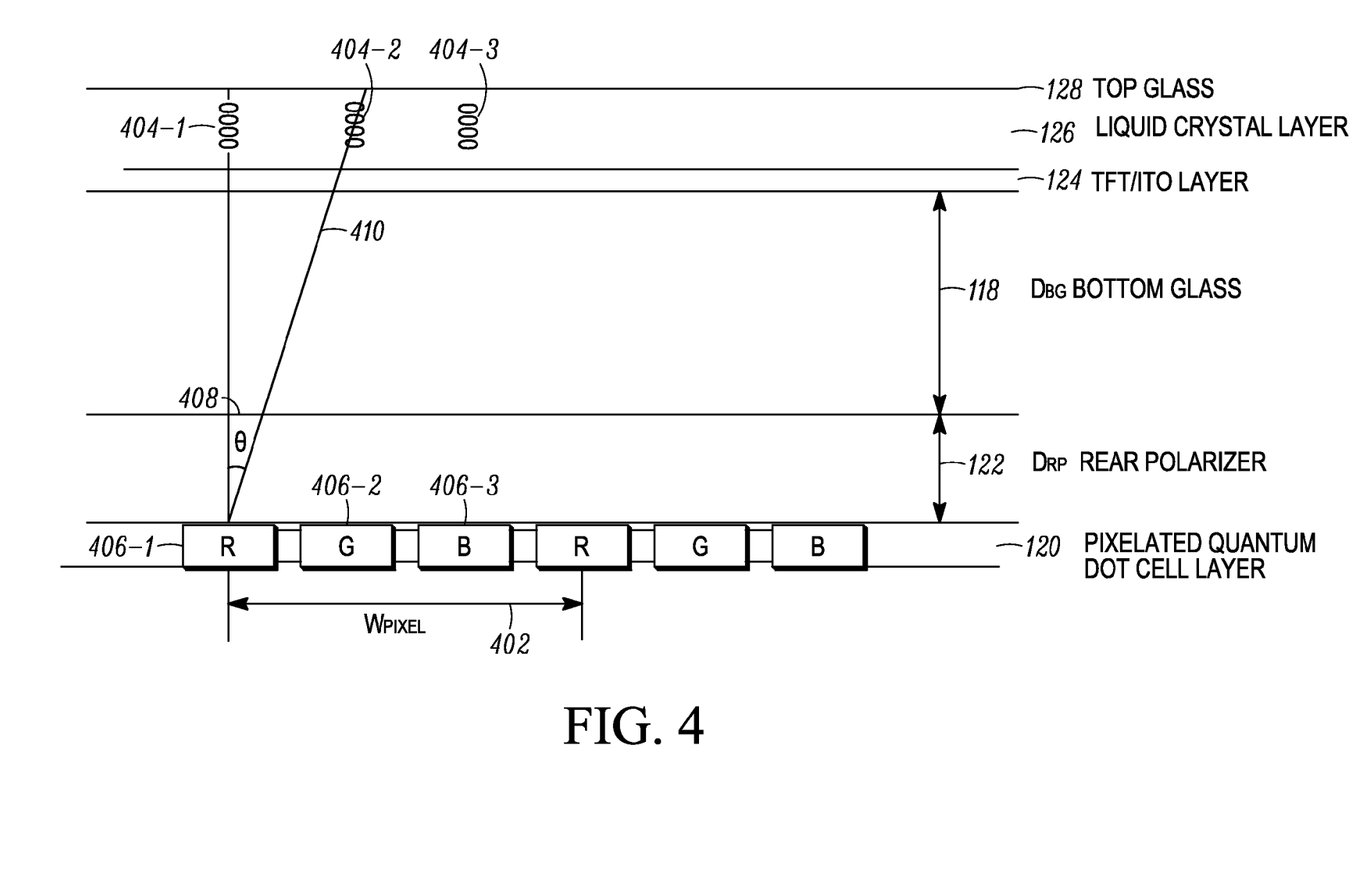
FIG. 4 shows an example of crosstalk according to one embodiment.

Crosstalk or parallax may occur if the thickness of bottom glass 118 and/or rear polarizer 122 are not controlled within a certain range. FIG. 4 shows an example of crosstalk according to one embodiment. In pixelated quantum dot cell layer 120, three sub-pixels are included in a pixel shown at 402. The pixel may be a certain width and includes three quantum dots that emit red, green, and blue light, respectively.

In liquid crystal layer 126, liquid crystals 404 are aligned with each sub-pixel. For example, liquid crystals 404-1 are aligned with a red quantum dot cell 406-1; liquid crystals 404-2 are aligned with a green quantum dot cell 406-2; and liquid crystals 404-3 are aligned with a blue quantum dot cell 406-3.

The red light emitted by quantum dot cell 406-1 is in the range of an angle of emission ($\theta_{emission}$) shown at 408 from quantum dot 406-1. The angle of emission may depend upon the angle of light that passes through quantum dot 406-1. For the angle of emission shown at 408, red light may pass into liquid crystals 404-2 that are aligned with a green quantum dot at 406-2, which results in crosstalk. In this case, LCD structure 100 may not be able to achieve the desired color display due to the crosstalk. For example, if the display is only to produce green light, but if red light and blue light leaks through, then only white light may be obtained instead of green light.

To prevent the leakage between sub-pixels, particular embodiments may control a distance (e.g., depth or vertical separation) between pixelated quantum dot cell layer 120 and liquid crystal layer 126. For example, depending on the design of LCD structure 102, the thickness ($d_{BG}$) of bottom glass 118 and/or the thickness of rear polarizer 122 ($d_1$) is controlled such that crosstalk does not occur based on the angle of emission for the quantum dots. Conventionally, a typical thickness of the bottom glass is 0.25 millimeters (mm) and the thickness of the rear polarizer is 0.15 mm. The pixel separation is around 0.12 mm. This translates to an angle of emission of less than or equal to 6° that is needed to prevent crosstalk. However, it is impractical for a quantum dot material to limit the emission angle to less than or equal to 6°.

In an out-of-cell design, rear polarizer 122 and bottom glass 118 are between pixelated quantum dot cell layer 120 and liquid crystal layer 126. Particular embodiments may design the thickness of rear polarizer 122 and bottom glass 118 to have an angle of emission $\theta_{emission}$ of around 60° up to +/-90°. To avoid the sub-pixel leakage to the neighboring sub-pixel, the following equation may be used:

$$(\tfrac{1}{3}W_{Pixel})/(d_{BG}+d_{RP})=\tan\theta>\tan\theta_{emission};$$

$$d_{BG}+d_{RP}<W_{Pixel}/\tan\theta_{emission};$$

If $\theta_{emission}$ is controlled to $\theta_{emission}=60°$, then $d_{BG}+d_{RP}<W_{Pixel}/\sqrt{3}$ Thus, if the angle of emission $\theta_{emission}$ is equal to 60°, then the thickness of the bottom glass 118 and thickness of rear polarizer 122 is equal to the width of the pixel/√3. In one embodiment, for an in-cell design, only rear polarizer 122 is in between pixelated quantum dot cell layer 120 and liquid crystal layer 126, the above equation for the out-of-cell design may be used without bottom glass 118 included. The thickness of rear polarizer 122 may be 2 microns and as thin as 0.3 microns. The emission angle may be +/-60° up to +/-90°

For an out of cell design (where rear polarizer 122 and pixelated quantum dot cell layer 120 are positioned at the back of bottom glass 118, which is outside of the cell including liquid crystal layer 126), both bottom glass 118 and rear polarizer 122 are in between the light emitting layer 120 and liquid crystal layer 126. For this design, the pixel width may be 0.25 mm with an emission angle of +/-60°. The bottom glass may be designed to be around 0.2 mm and the thickness of rear polarizer 122 may be designed to be around 0.1 mm with a range of 0.07 mm to 0.13 mm. In one embodiment that will be described in more detail below with respect to FIG. 5, advanced optical features may be used to control the light emission angle, such as using a collimating feature that aligns the light or a micro-cavity structure for each pixel.

Figure 5:
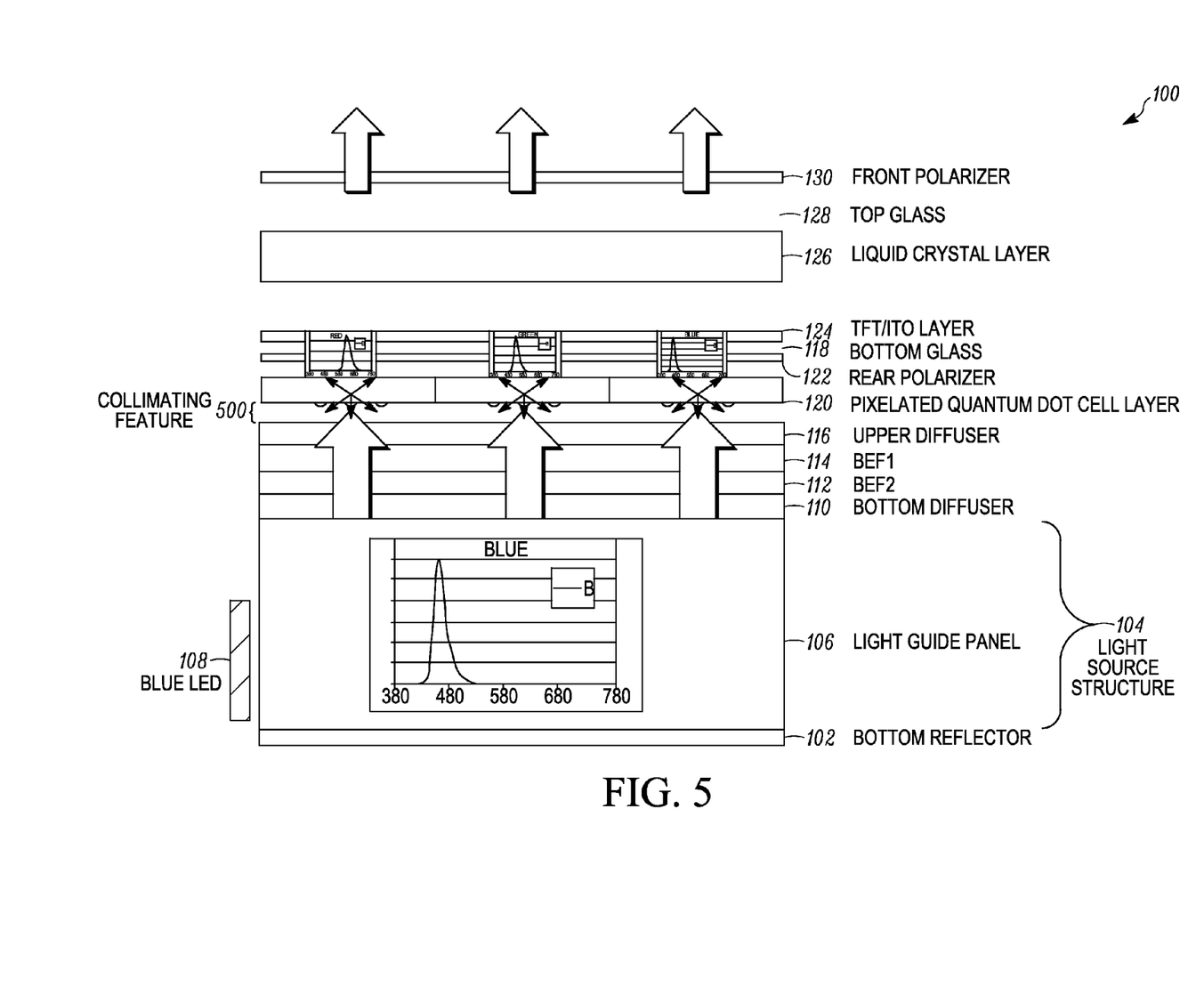
FIG. 5 depicts an example of the LCD structure that includes an optical feature to confine the angle of emission for quantum dots according to one embodiment.

FIG. 5 depicts an example of LCD structure 100 that includes an optical feature to confine the angle of emission for quantum dots according to one embodiment. For example, pixelated quantum dot cell layer 120 includes a collimating feature 500. Collimating feature 500 shapes light emitted from light source structure 104. For example, each sub-pixel may have a collimating feature 500 that can shape the light for each respective sub-pixel. For example, each collimating feature 500 can shape the light direction to reduce the angle of emission for light entering each quantum dot. The angle may be controlled such that crosstalk does not occur. For example, collimating feature 500 may limit the emission angle $\theta_{emission}$ to +/-45°, +/-30°, or any other required emission angle that is calculated as described above.

Ambient Light Excitation

Ambient light may be light that is received from outside of LCD structure 100 and the electronic device. For example, ambient light may be sunlight, artificial light, or any other light outside of light emitted from light source structure 104. Particular embodiments may control light source structure 104 based on the amount of ambient light that is being received and then converted into red, green, or blue light that is emitted by pixelated quantum dot cell layer 120. For example, LCD structure 100 may operate in three different modes: a transmissive mode, a reflective mode, and a transflective mode. The transmissive mode is solely when a backlight is used, such as light source structure 104. The transmissive mode is shown in FIGS. 1B, 2, 3, and 5. A reflective mode is when light source structure 104 is turned off and only ambient light is used to excite pixelated quantum dot cell layer 120. A transflective mode is where both ambient light and also light from light source structure 104 is passed through pixelated quantum dot cell layer 120.

Figure 6:
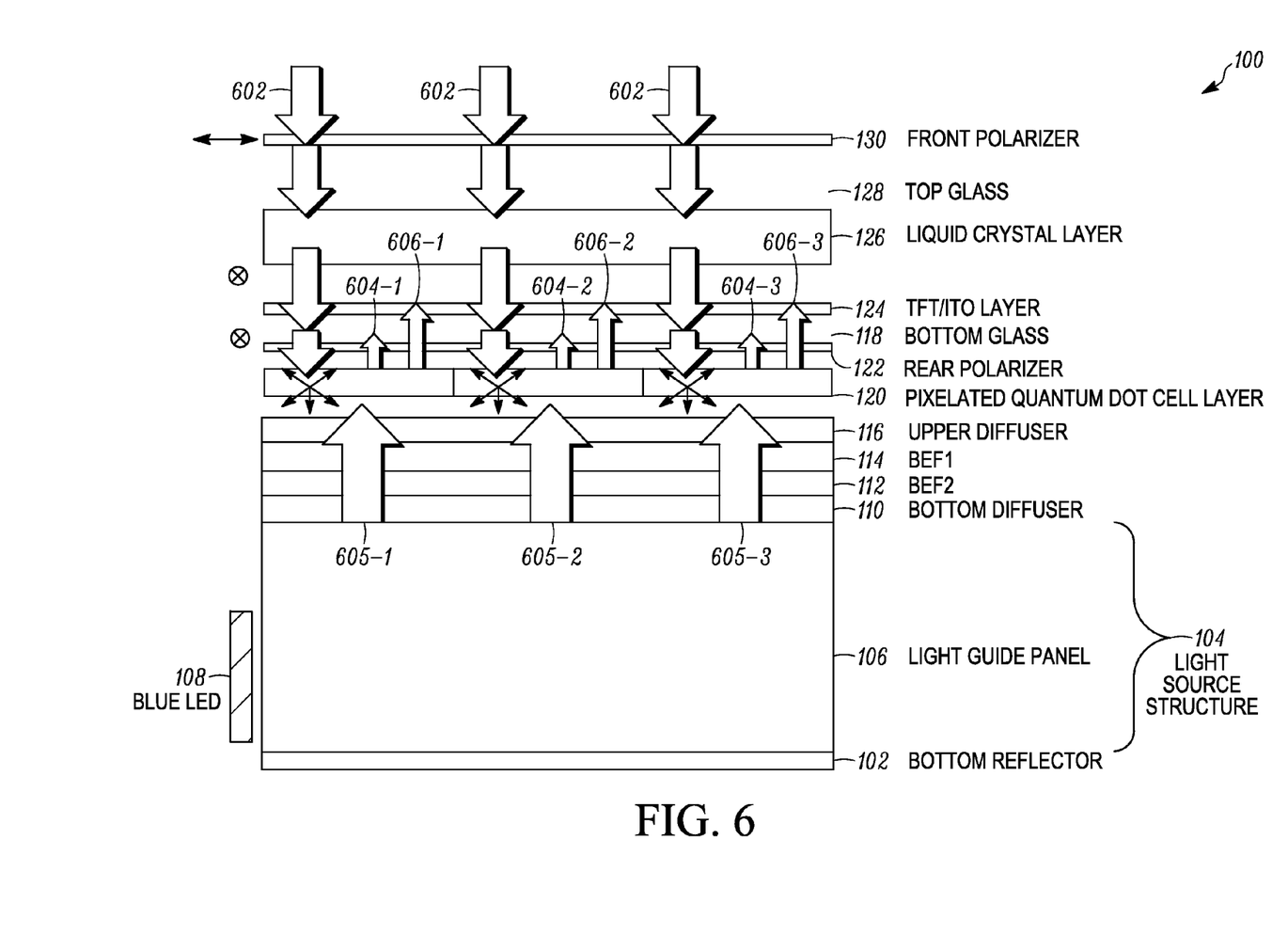
FIG. 6 depicts an example of an LCD structure operating in a transflective mode according to one embodiment.

FIG. 6 depicts an example of an LCD structure 100 operating in a transflective mode according to one embodiment. Ambient light, which may include ultra violet (UV) light from outside of LCD structure 100, may be received at LCD structure 100 as shown at 602. In one embodiment, LCD structure 100 may use a UV blocking front polarizer to prevent UV light from reaching liquid crystal layer 126. The ambient light is passed through front polarizer 130, top glass 128, and liquid crystal layer 126. The ambient light continues through rear polarizer 122 to pixelated quantum dot cell layer 120. The ambient light will excite the pixelated quantum dot cell layer 120 to emit light in different directions (e.g., up through rear polarizer 122). For example, additional red, blue, or green light may be emitted by pixelated quantum dot cell layer 120 based on the ambient light.

Liquid crystal layer 126 may be controlled in an ON/OFF state to determine which sub-pixel can be excited by the ambient light and converted to a useful signal. When liquid crystal layer 126 is in an ON state, the ambient light passed through front polarizer 130 is at a first polarization. Then, the ambient light is rotated to a different polarization by liquid crystal layer 126 and passes through rear polarizer 122. This causes light to be emitted by pixelated quantum dot cell layer 120 in the red, blue, and green sub-pixels at 604-1, 604-2, and 604-3, respectively. Additionally, light from light source structure 104 shown at 605-1, 605-2, and 605-3 is converted into red, blue, and green light at the red, blue, and green sub-pixels at 606-1, 606-2, and 606-3, respectively. When liquid crystal layer 126 is in an OFF state, the ambient light can pass through front polarizer 130, but cannot pass through rear polarizer 122 and will not excite the quantum dot cells.

Figure 7:
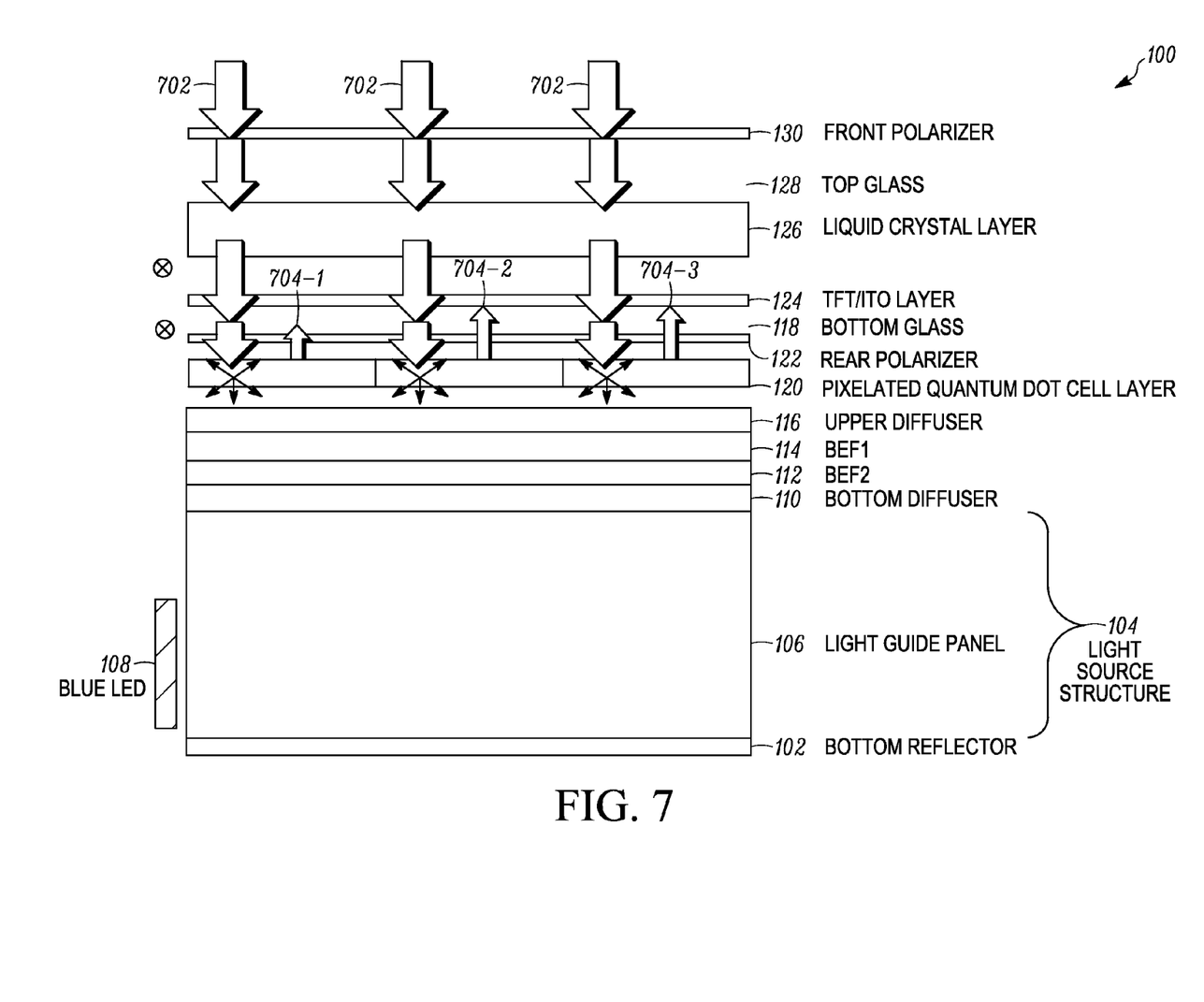
FIG. 7 depicts an example of an LCD structure operating in a reflective mode according to one embodiment.

FIG. 7 depicts an example of an LCD structure 100 operating in a reflective mode according to one embodiment. In this case, only ambient light received at 702 is converted into red, green, and blue light at the red, green, and blue sub-pixels at 704-1, 704-2, and 704-3, respectively. Light source structure 104 is turned off in this case and does not contribute to any of the red, green, and blue light emitted from pixelated quantum dot cell layer 120. Turning off the light source structure 104 can save power for LCD.

Figure 8:
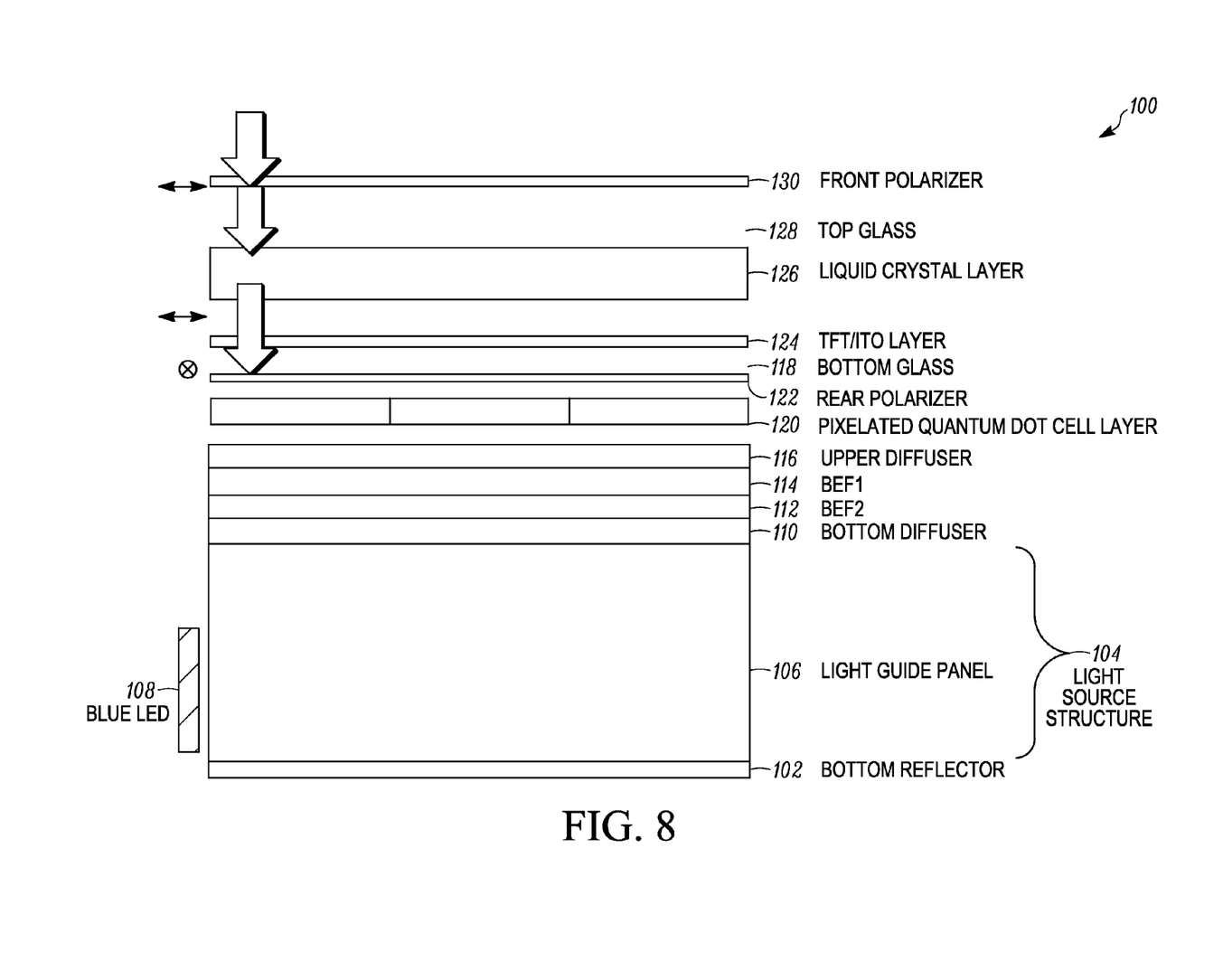
FIG. 8 depicts an example of LCD structure when ambient light is blocked by front and rear polarizers when LC is in OFF state according to one embodiment

FIG. 8 depicts an example of LCD structure 100 when ambient light is blocked by front and rear polarizers 130, 122, respectively, when liquid crystal layer 126 is in an OFF state according to one embodiment. Ambient light passes through front polarizer 130 and through liquid crystal layer 126. However, because liquid crystal layer 126 is in an OFF state, the ambient light is not rotated to a different polarization. Thus, rear polarizer 122 blocks the ambient light. Ambient light does not reach pixelated quantum dot cell layer 120, which means light is not emitted from pixelated quantum dot cell layer 120 based on the ambient light. By blocking the ambient light, unwanted electrical noise may be reduced, because ambient excitation is limited when liquid crystal layer 126 is in the OFF state. Thus, positioning pixelated quantum dot cell layer 120 below rear polarizer 120 may significantly reduce electrical noise.

Figure 9:
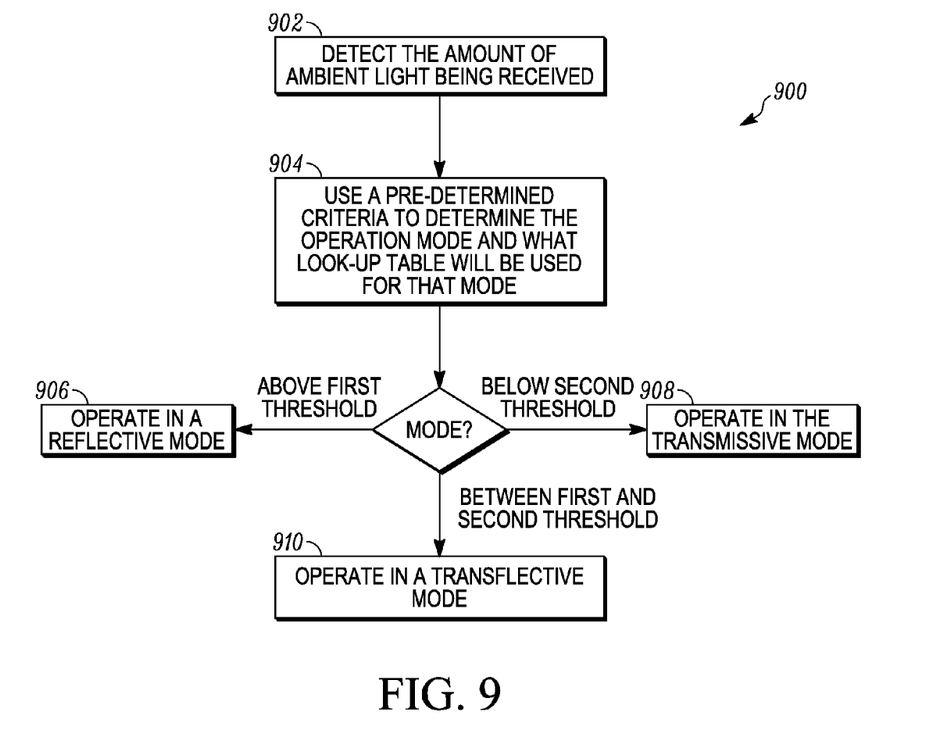
FIG. 9 depicts a simplified flowchart of a method for operating LCD display 100 in different modes according to one embodiment.

Because the ambient light can be used to supplement the back light provided by light source structure 104, LCD structure 100 may dynamically operate in different modes. In one embodiment, the intensity of light source structure 104 may be adjusted based on the amount of ambient light being received and converted to light emitted by pixelated quantum dot cell layer 120. FIG. 9 depicts a simplified flowchart 900 of a method for operating LCD display 100 in different modes according to one embodiment. At 902, LCD structure 100 detects the amount of ambient light being received. For example, the amount of light of different components, such as the amount of blue component of ambient light, may be used. This may be useful considering there may be various sources of ambient light: e.g., sun light, fluorescent light (FL), incandescent light, etc. At 904, a pre-determined criteria is used to determine the operation mode and what look-up table (LUT) will be used for that mode. For example, particular embodiments may use a LUT for transflective mode to match/manage color between signals being excited by the backlight and being excited by the ambient light; another LUT may be used for a reflective mode to achieve certain color and gamma with optimal power consumption; and a third LUT may be employed for a transmissive mode to achieve pre-determined color and gamma performance. In one example, if the ambient light is above a first threshold, then LCD structure 100 operates in a reflective mode at 906. In this case, a controller may turn off light source structure 104 such that no light is emitted from light source structure 104. In this case, the ambient light passed into pixelated quantum dot cell layer 120 is solely used to provide the LCD display.

At 908, if the ambient light level is below a second threshold, then LCD structure 100 operates in the transmissive mode. In the transmissive mode, the controller turns on light source structure 104 and the light emitted from light source structure 104 is used to provide the LCD display. Because ambient light is low, the ambient light provides little ambient light excitation.

If the ambient light is between the first threshold and the second threshold, or within a range in between the first threshold and second threshold, then LCD display 100 operates in a transflective mode. In this case, both light from light source structure 104 and ambient light are used to provide the LCD display. Although thresholds are described, it should be understood that other methods (criteria) may be used to determine which mode in which to operate.

In addition to adjusting the intensity of light emitted from light source structure 104, the ambient light may be controlled to enhance the colors emitted by pixelated quantum dot cell layer 120. For example, in the transflective mode, using the ambient light to supplement color emitted by pixelated quantum dot cell layer 120 that are excited by the light source 104 may provide a better image quality. In one example, the transmission ratio or transmittance of liquid crystals in liquid crystal layer 126 may be adjusted based on the ambient light strength. The transmittance of liquid crystal layer can determine how much ambient light will pass through and how much signal output will eventually exit the LCD structure (so for signals generated by ambient light, the transmittance can have dramatic impact on the signal strength as light passes the liquid crystal layer twice—i.e., first pass, ambient light in and second pass, signal light out). For example, if more ambient light is being received and converted into light emitted from pixelated quantum dot cell layer 120, then the transmission of liquid crystal layer 126 may be lowered. For example, a look-up table may be consulted based on the ambient light and the drive signal to TFT/ITO layer 124 may be adjusted to adjust the transmission ratio of liquid crystal layer 126. This adjusts how much light can be passed through liquid crystal layer 126. For example, if the ambient light is causing more green light to be emitted, then the red, green, and blue light may no longer be in a preferred balance. Particular embodiments adjust the transmittance of a cell to reduce the transmittance for a green cell. For example, the transmittance may be reduced from 100% to 90%. This adjustment may balance the colors emitted.

In one embodiment, a color filter may be used in combination with pixelated quantum dot cell layer 120. The color filter is used to control the ambient excitation signal. Because the emission spectrum of quantum dots is very narrow, the color filter can also be thin and the transmittance is not lowered as much. The ultra violet portion of ambient light should be blocked to protect the liquid crystals and quantum dots. However, the color filter may let blue light pass (in addition to passing the respective color associated with the filter) so that the blue light can pass and excite pixelated quantum dot cell layer 120. In one embodiment, a color filter is located below front polarizer 130 and at the bottom surface of the top glass 128. However, other positions for the color filter may be appreciated.

Figure 10:
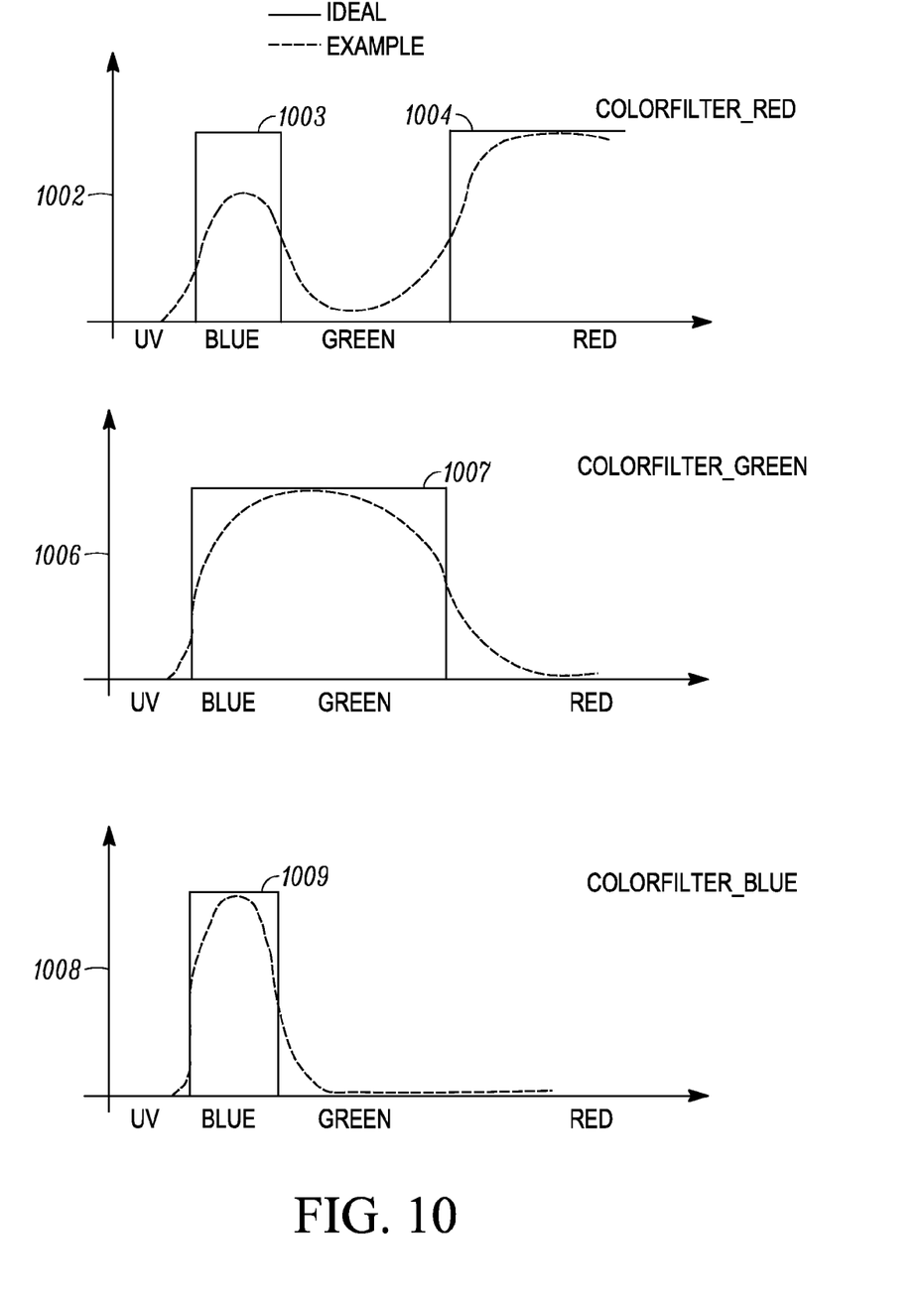
FIG. 10 shows the transmission spectrum of a color filter design according to one embodiment.

FIG. 10 shows the transmission spectrum of a color filter according to one embodiment. As can be seen, the y axis is the amount of light that is passed and the x axis is the wavelength of light. Three color filters of red, green, and blue are shown. In a graph 1002, at 1003, a red color filter allows blue light to pass and at 1004, red light to pass. At 1007, graph 1006 shows that blue and green light are passed. At 1009, graph 1008 shows that only blue light is passed. The solid line shown in graphs 1002, 1006, and 1008 are ideal filter characteristics and the dotted lines are example color filter characteristics. The characteristics of the above color filters are different from conventional color filters used to achieve high color gamut, where each conventional color filter only lets a narrow spectrum portion of light pass and transmittance of such conventional color filters are very low. In particular embodiments, a backlight, e.g., blue light, excites the quantum dot cell and generates a narrow spectrum light of a specific color, as this spectrum is very narrow due to the use of the quantum dot, particular embodiments can afford to use wide passband color filters and still achieve pure colors—high color gamut. The color filters also manage ambient light as a small portion of ambient light may penetrate the quantum dot cell layer and reach the backlight and be reflected back and penetrate the quantum dot cell layer to become noise. The blue light can pass red color filters and excite the quantum dot cell, and also a small portion of red of ambient light can also pass, but will not excite the quantum dot cell. Ideally red light should be absorbed by the quantum dot material, but in reality it does not; blue light can pass green color filters and excite the quantum dot cell, a small portion of green of ambient can also pass but will not excite quantum dot cell; and blue light can pass blue color filters and excite the quantum dot cell. Thus, a color filter is used to filter out undesired light of certain wavelengths.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It will be appreciated that some embodiments may be comprised of one or more generic or specialized processors (or "processing devices") such as microprocessors, digital signal processors, customized processors and field programmable gate arrays (FPGAs) and unique non-transitory stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having non-transitory computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for controlling a liquid crystal display (LCD), the method comprising:
    receiving a first light from a light source structure at a first side of a light emitting layer that includes a photo-luminescent material that emits light with different wavelengths upon excitation by the first light;
    emitting from the light emitting layer a first color component based on receiving the first light, a second color component based on receiving the first light, and a third color component based on receiving the first light, wherein the first, second, and third components are emitted from a second side, opposite the first side, of the light emitting layer;
    receiving ambient light through a first polarizer layer of a first polarization state positioned above the light emitting layer, a liquid crystal layer positioned above the first polarizer layer, and a second polarizer layer of a second polarization state positioned above the liquid crystal layer, wherein the ambient light is received at the second side of the light emitting layer, wherein the light emitting layer, the liquid crystal layer, and the first polarizer layer are all disposed between a bottom glass and a top glass without a glass layer intervening between the first polarizer layer and the liquid crystal layer;
    converting the ambient light into the first color component, the second component, and the third color component in the light emitting layer; and
    dynamically controlling an intensity of the first light based on the converting of the ambient light, wherein controlling the intensity comprises dynamically adjusting between a transmissive mode, a reflective mode, and a transflective mode, wherein:

the reflective mode is when the first light source is in an OFF state and the liquid crystal layer is controlled to allow ambient light to be selectively incident upon the second side of the light emitting layer to convert the ambient light into the first color component, the second color component, and the third color component in the light emitting layer.

2. The method of claim 1, further comprising adjusting at least one of the first color component, the second component, and the third color component being emitted by the light emitting layer based on the ambient light being converted into the first color component, the second component, and the third color component.

3. The method of claim 2, wherein adjusting further comprises using a look up table to determine an amount of adjustment for the at least one of the first color component, the second component, and the third color component being emitted by the light emitting layer based on the ambient light being converted into the first color component, the second component, and the third color component.

4. The method of claim 1, wherein controlling the intensity comprises controlling the light source structure to adjust the light emitted by the light source structure based on the ambient light being converted into the first color component, the second component, and the third color component.

5. The method of claim 4, wherein controlling the intensity further comprises using a look up table to determine an intensity for the light emitted by the light source structure.

6. The method of claim 1, wherein:
the transmissive mode is when the first light source is in an ON state, and
the transflective mode is when the first light source is in an ON state and the ambient light is converted into the first color component, the second color component, and the third color component in the light emitting layer.

7. The method of claim 1, wherein the photo-luminescent material of the light emitting layer includes quantum dot cells or a photo-luminescent phosphor material.

8. An apparatus comprising:
a light source structure configured to emit a backlight;
a light emitting layer including a photo-luminescent material that emits display light with different wavelengths upon excitation by the backlight emitted by the light source structure incident upon a backside of the light emitting layer or from ambient light incident upon a front side of the light emitting layer, wherein a first portion of the photo-luminescent material emits a first color component based on receiving the backlight or the ambient light, a second portion of photo-luminescent material emits a second color component based on receiving the backlight or the ambient light, and a third portion of the photo-luminescent material emits a third color component based on receiving the backlight or the ambient light;
a first polarizer layer of a first polarization state positioned above the light emitting layer;
a bottom glass;
a liquid crystal layer positioned above the first polarizer layer;
a top glass;
a second polarizer layer of a second polarization state positioned above the top glass; and
a controller coupled to dynamically control an intensity of the backlight based upon a brightness of the ambient light,
wherein the light emitting layer, the liquid crystal layer, and the first polarizer layer are all disposed between the bottom glass and the top glass without a glass layer intervening between the first polarizer layer and the liquid crystal layer.

9. The apparatus of claim 8, wherein the light source structure comprises:
an external light source configured to emit the backlight; and
a light guide panel configured to receive the backlight and direct the backlight to the light emitting layer.

10. The apparatus of claim 8, wherein a distance between the light emitting layer and the liquid crystal layer is based on a desired angle of emission for the first color component, the second color component, and the third color component being emitted from the light emitting layer and a width of a pixel in the liquid crystal layer, wherein the distance comprises a depth of the bottom glass and a depth of the first polarizer layer when the bottom glass and the first polarizer layer are in between the light emitting layer and the liquid crystal layer.

11. The apparatus of claim 10, wherein the distance comprises a depth of the first polarizer layer when the first polarizer layer is in between the light emitting layer and the liquid crystal layer.

12. The apparatus of claim 8, wherein:
the light source structure emits the backlight as a blue light,
the first portion of the photo-luminescent material emits the first color component based on receiving the backlight and absorbs the second color component and the third color component,
the second portion of the photo-luminescent material emits the second color component based on receiving the backlight and absorbs the first color component and the third color component, and
the third portion of the photo-luminescent material emits the third color component by passing the backlight.

13. The apparatus of claim 8, wherein the photo-luminescent material of the light emitting layer includes quantum dot cells or a photo-luminescent phosphor material.

14. The apparatus of claim 8, wherein when the liquid crystal layer is in the ON state, the light emitting layer is controlled to adjust at least one of the first color component, the second component, and the third color component emitted based on the ambient light being converted into the first color component, the second component, and the third color component.

15. The apparatus of claim 14, wherein the light emitting layer is controlled based on a look up table (LUT) and an amount of ambient light being converted into the first color component, the second component, and the third color component.

16. The apparatus of claim 8, wherein when the liquid crystal layer is in the ON state, the light source structure is controlled to adjust the backlight emitted by the light source structure based on the ambient light being converted into the first color component, the second component, and the third color component.

17. The apparatus of claim 8, wherein the first color component, the second component, and the third color component is emitted from the apparatus without passing through a color filter.

18. The apparatus of claim 8, further comprising a color filter including a first portion configured to pass the first color component and the third color component, a second portion configured to pass the second color component and the third color component, a third portion configured to pass the third color component.

* * * * *